United States Patent [19]
Orlowski et al.

[11] Patent Number: 5,266,954
[45] Date of Patent: Nov. 30, 1993

[54] MICROWAVE VEHICLE DETECTOR

[75] Inventors: David P. Orlowski, Clinton; William R. Lang, Jr., Dexter, both of Mich.

[73] Assignee: Microwave Sensors, Ann Arbor, Mich.

[21] Appl. No.: 860,003

[22] Filed: Mar. 30, 1992

[51] Int. Cl.[5] .................................. G01S 13/62
[52] U.S. Cl. ........................ 342/69; 342/114; 342/115
[58] Field of Search ............... 342/69, 104, 114, 115

[56] References Cited

U.S. PATENT DOCUMENTS

| | | | |
|---|---|---|---|
| 3,182,312 | 5/1965 | Daniels | 342/69 |
| 3,728,721 | 4/1973 | Lee et al. | 342/28 |
| 3,978,481 | 8/1976 | Angwin et al. | 342/114 X |
| 4,456,911 | 6/1984 | Augustine | 342/122 |

FOREIGN PATENT DOCUMENTS

| | | |
|---|---|---|
| 2149991A | 6/1985 | United Kingdom . |
| 2177277A | 1/1987 | United Kingdom . |

OTHER PUBLICATIONS

U.S. Ser. No. 187,763 Patent Application and drawings (now abandoned) filed Apr. 29, 1988 entitled "A Microwave Vehicle Detector".
Whelen Eng. Tracker Vehicle Detector Model TDN-30, TDW-10 and TDN-20 specification sheets (7 pages).
Safe Lite Systems "Smart Road Safety Options"(8 pages).
R. M. Tyburski, Milton Systems Corp. "A Review of Current Road Sensor Technology for Traffic Monitoring" (1988) (5 pages).
"Smart Streets", Machine Design (Jun. 21, 1990) p. 57.
D9 Series Intrusion Detector Specification Sheet.
D9 Microwave Schematic Diagram, Drawing CE 31A006.
D9 Installation Manual.
D15 Approach Sensor Specification Sheet.
D15 Microwave Schematic Diagram, Drawing No. CE 31A026.
D15 Installation Manual.
General Railway Signal Co. Manual (CHEKAR) Ultrasonic Detector).
Alpha GOS Detector Module Specification Sheet.
Safetran Traffic Systems Glossary.
Protech Instruction Manual (Models SD80 and SD150).

*Primary Examiner*—T. H. Tubbesing
*Attorney, Agent, or Firm*—Harness, Dickey & Pierce

[57] ABSTRACT

The present invention provides a microwave vehicle detector which includes a transceiver for transmitting microwave energy into a desired target area and for receiving reflections of this microwave energy from vehicle movement in this target area. The transceiver includes first and second diodes for enabling the microwave vehicle detector to determine the direction of vehicle movement relative to the position of the microwave vehicle detector. In this regard, these diodes are balanced, such that a predetermined phase difference will be produced between the doppler shift signals generated by these diodes. This phase difference is analyzed by a microprocessor to determine the speed and direction of the vehicle being detected.

17 Claims, 11 Drawing Sheets

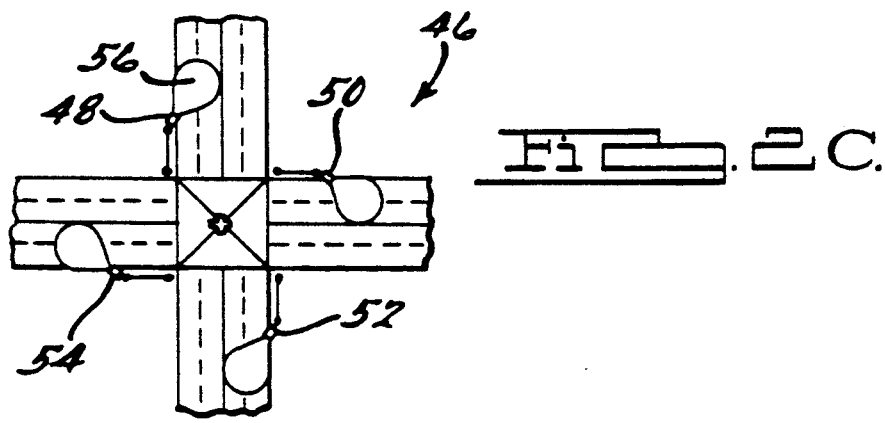
FIG. 2C.
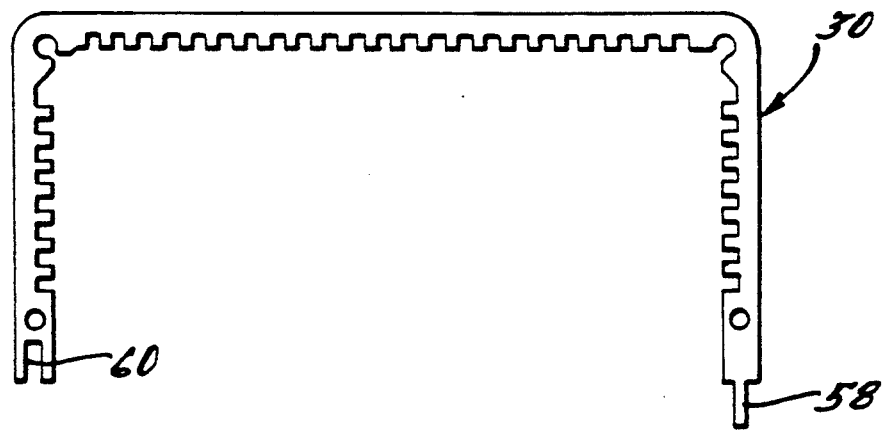
FIG. 3A.
FIG. 3B.
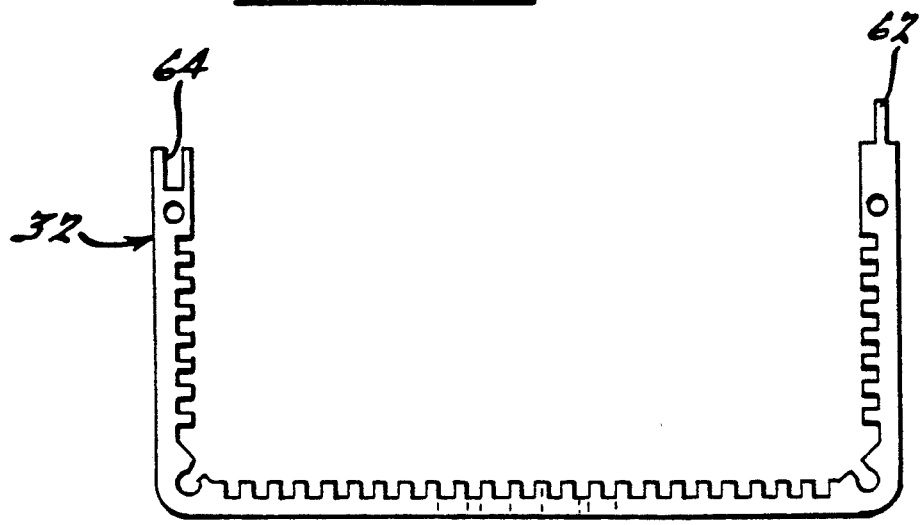

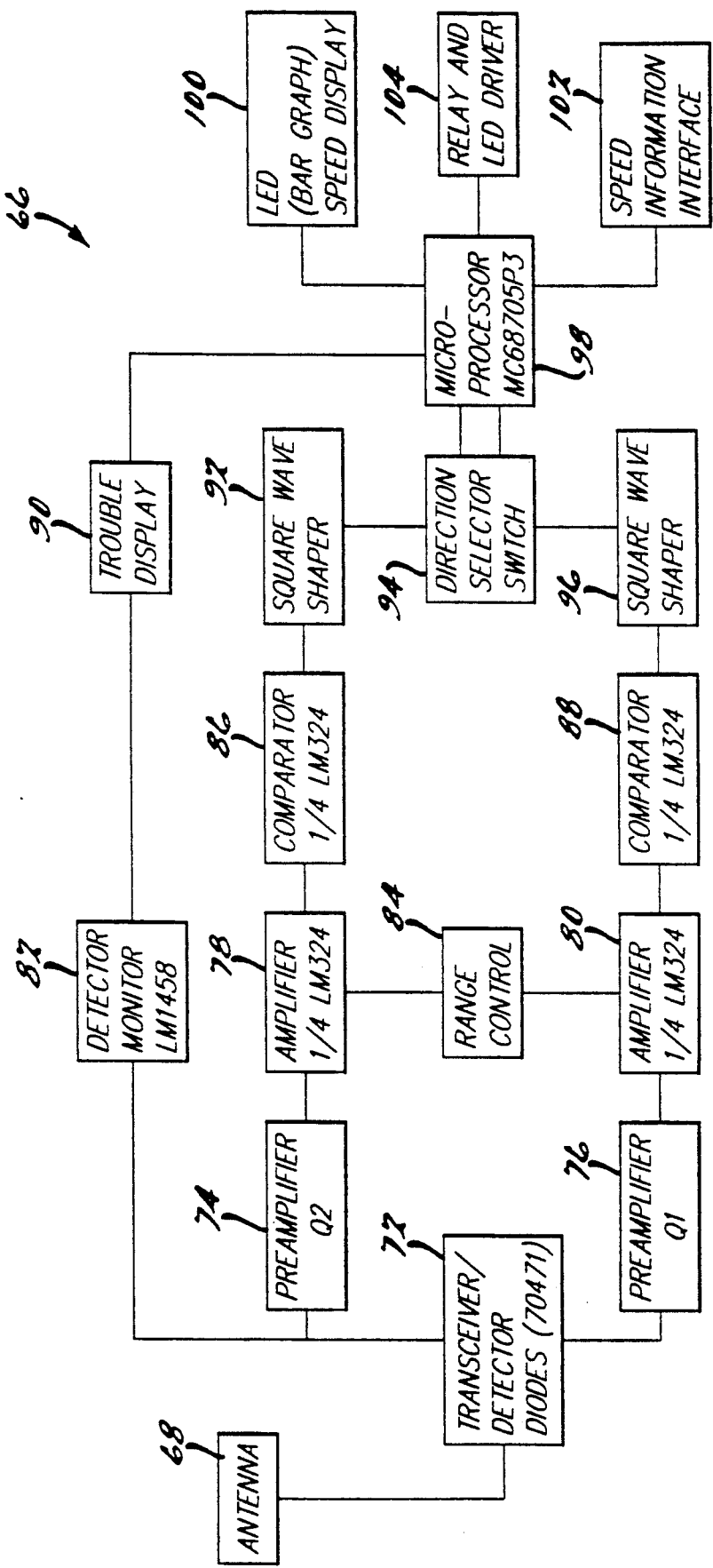

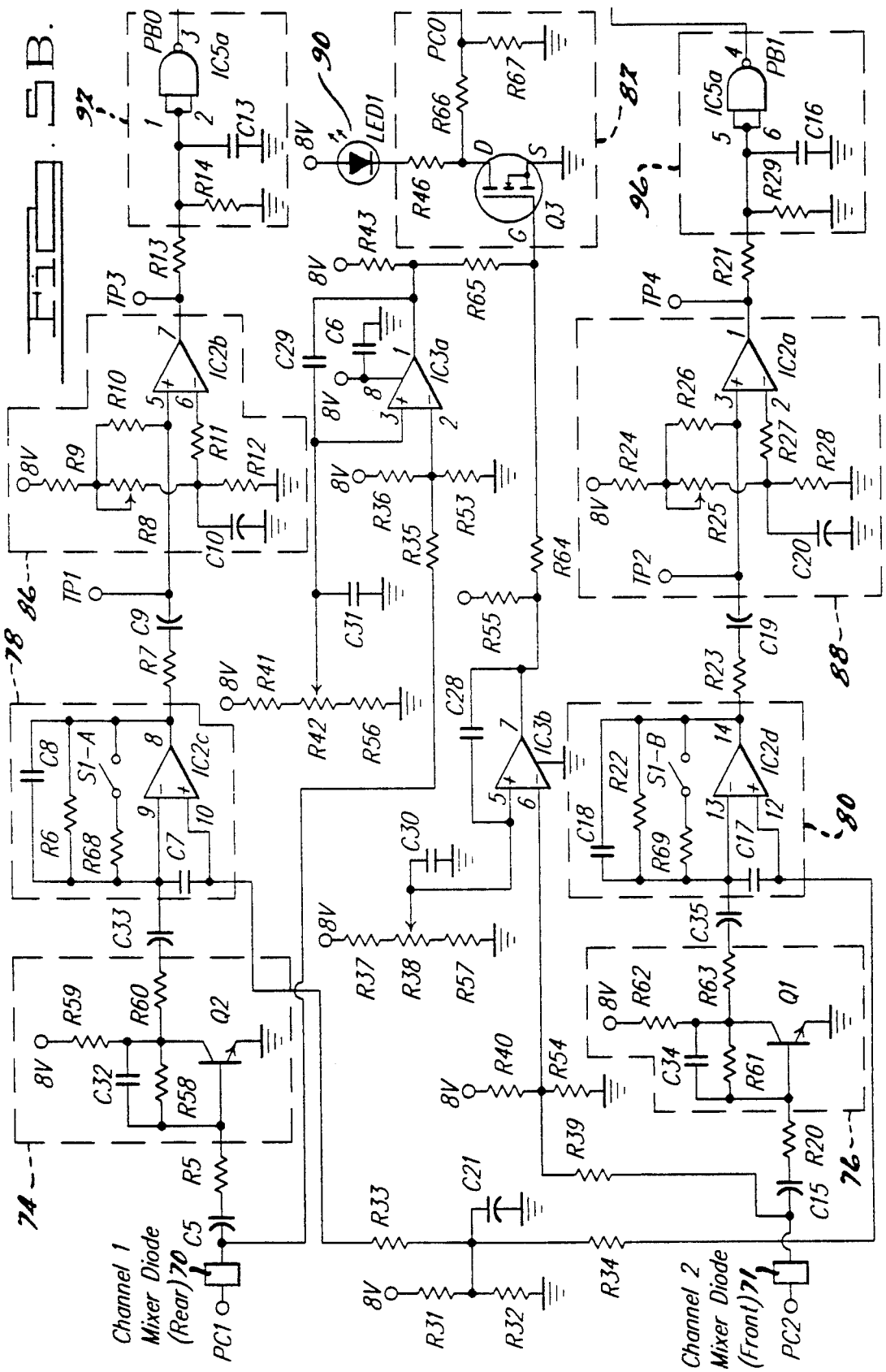

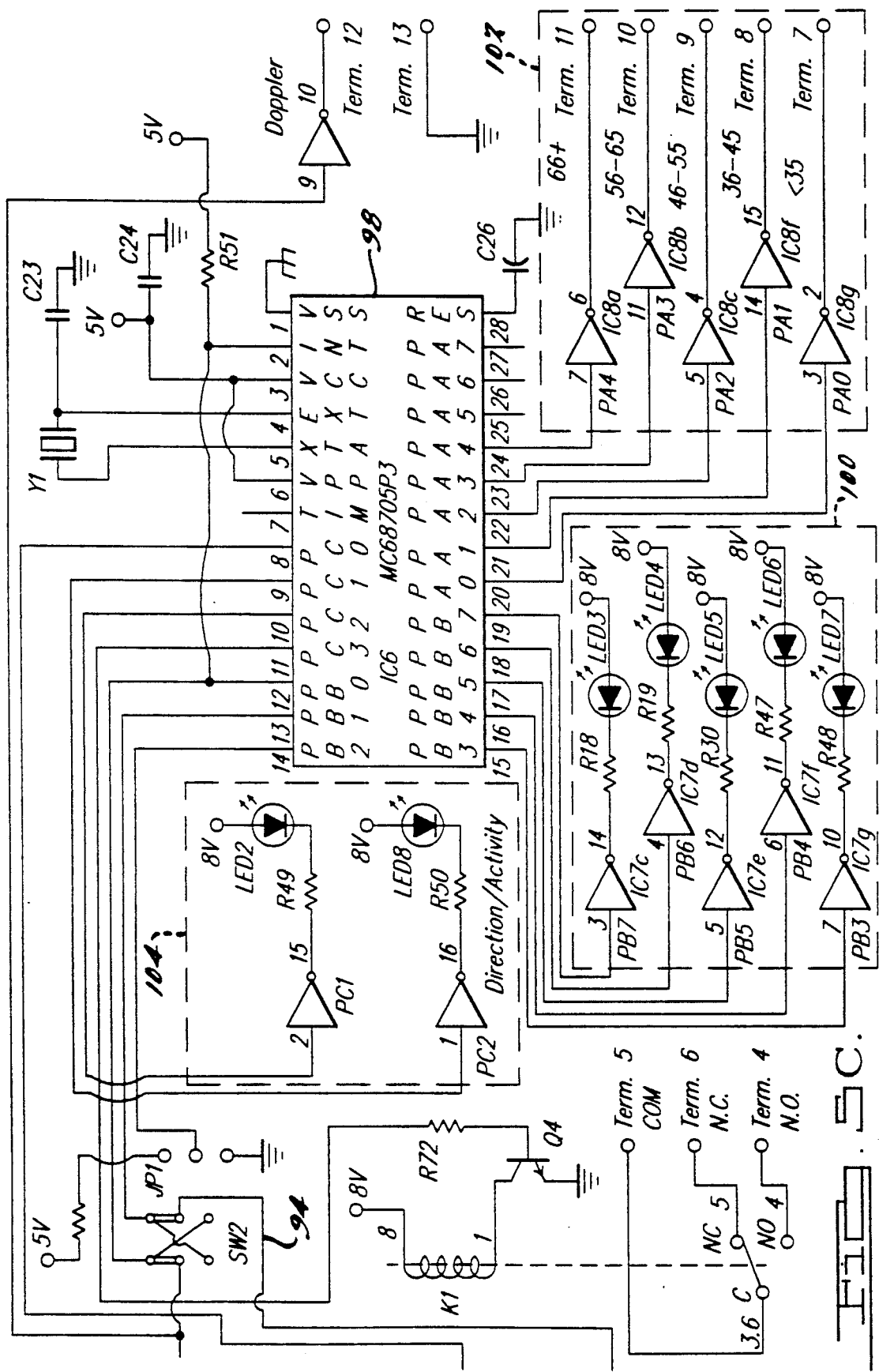

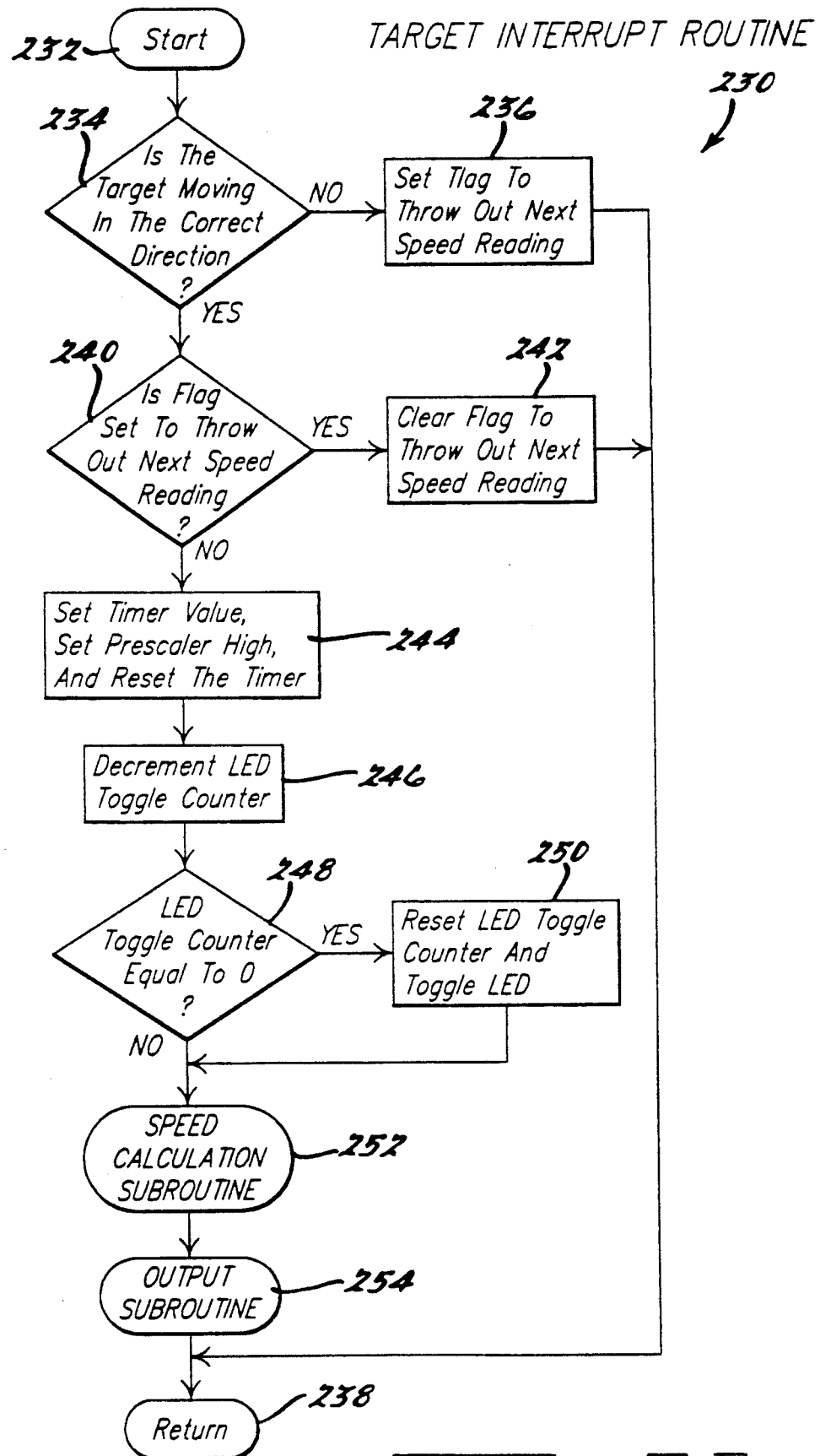

MICROWAVE VEHICLE DETECTOR

BACKGROUND AND SUMMARY OF THE INVENTION

The present invention relates generally to traffic control, and specifically to a microwave vehicle detector for detecting traffic movement in a predetermined direction.

The most widespread form of vehicle traffic control used in urban areas today is provided by a network of traffic lights. In view of the fact that the frequency of traffic at individual intersections will generally vary during different times of the day, it would be desirable to adjust the sequencing operation of these traffic lights in response to such traffic variations. In this regard, many traffic systems currently use computers so that the sequencing operation of the traffic lights may be varied under programmed control. However, the effectiveness of such programmed control schemes is limited because traffic patterns are subject to change, particularly in areas which are experiencing rapid development.

Accordingly, some traffic systems have additionally employed underground loops at various intersections in order to provide on the spot feedback to a centralized controller of the traffic conditions at these intersections. In this regard, one or more loops will be buried at different points in the pavement to detect whether traffic is present, and how much traffic is present if more than one loop is used. However, these loops are subject to damage due to seasonal temperature changes or heavy traffic. In the event that replacement is required, then the surrounding pavement will also have to be cut out and replaced. This will not only be expensive, but this replacement will inevitably disrupt traffic at that location.

The use of an ultrasonic sensor has also been suggested as an alternative to the use of underground loops. However, outdoor use of an ultrasonic sensor is problematic in that temperature and humidity will affect the speed of sound. Additionally, the sensor may have difficulty in differentiating between the sound that has been transmitted by the sensor and other sources of ultrasonic sound.

More recently, a microwave based detector device has been used for detecting vehicle movement, namely the TC-20 vehicle detector manufactured by the assignee of the present invention. However, the TC-20 detector had a relatively limited range and discrimination capability, and provided only an analog output signal.

Accordingly, it is a principal objective of the present invention to provide a microwave based vehicle detector which has a substantially increased range of detection without increasing the power to the microwave transceiver.

More specifically, it is an objective of the present invention to provide a microwave vehicle detector which not only detects and analyzes traffic movement, but also provides a variety of buffered outputs that can be used by external devices, such as a monitoring computer or traffic signs.

It is another objective of the present invention to provide a microwave vehicle detector which is capable of determining the speed of the vehicles being monitored and enabling the displaying this information in a convenient fashion.

In order to the achieve the foregoing objectives, the present invention provides a microwave vehicle detector which includes a transceiver for transmitting microwave energy into a desired target area and for receiving a reflection of this microwave energy from vehicle movement in this target area. The transceiver includes first and second receiver diodes for enabling the microwave vehicle detector to determine the direction of vehicle movement relative to the position of the microwave vehicle detector. In this regard, these diodes are balanced, such that a predetermined phase difference will be produced between the doppler shift signals generated by these diodes. This phase difference is analyzed by a microprocessor to determine the speed and direction of the vehicle being detected.

The microwave vehicle detector also includes signal shaping circuitry for transforming the doppler shift signals generated by the detector diodes into square wave signals suitable for a type of pattern recognition analysis by the microprocessor. A relay control and driver circuit is also provided for causing a normally activated relay to become deactivated in response to the detection of vehicle movement through the target area in the predetermined direction selected for the microwave vehicle detector. The microprocessor also generates a number of output signals which may be used to indicate the speed of the target vehicle. These output speed signals may also be used in intelligent vehicle and highway systems and/or control the messages displayed on roadway message signs, such as work crew signs.

The present invention also includes a monitor circuit for causing the relay to become deactivated in response to a predetermined change in the bias level of either the first or second detector diodes. Specifically, the monitor circuit includes a voltage sensitive switching circuit connected to each of the detector diodes, and a controlled conduction device which is responsive to these voltage sensitive switching circuits. The output from the controlled conduction device is connected to the relay control and driver circuit, such that the monitor circuit will tell the microprocessor to trigger the deactivation of the relay when the bias level of either of the detector diodes has past beyond certain threshold levels.

When the microprocessor triggers the deactivation of the relay, the relay will be deactivated until the bias condition is corrected. In contrast, when vehicle movement triggers the deactivation of the relay, the relay will automatically be reactivated by the microwave vehicle detector after a predetermined time duration. This difference in deactivation times will enable a traffic controller to discern whether or not the microwave vehicle detector is operational.

Additional advantages and features of the present invention will become apparent from a reading of the detailed description of the preferred embodiment which makes reference to the following set of drawings in which:

BRIEF DESCRIPTION OF THE DRAWINGS

FIG. 2C illustrates the use of multiple microwave vehicle detectors to cover two lanes of traffic in four directions at an intersection.

FIGS. 3A and 3B represent a cross-sectional view of the top and bottom sections of the enclosure for the microwave vehicle detector shown in FIG. 1.

FIG. 4 is a block diagram of the circuit for the microwave vehicle detector according to the present invention.

FIGS. 5A-5C illustrate a schematic diagram of the microwave vehicle detector circuit shown in FIG. 4.

FIGS. 6A, 6B, 6C, 6D, and 6E are flow charts which outline the steps performed by the microprocessor.

DETAILED DESCRIPTION OF THE PREFERRED EMBODIMENT

Figure 1:
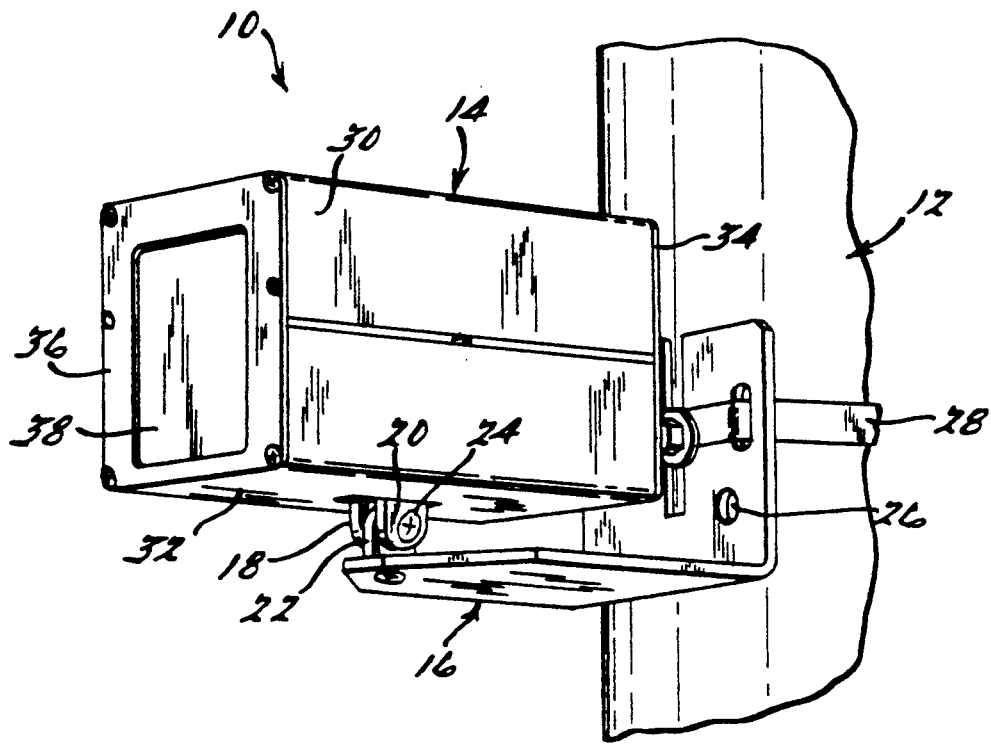
FIG. 1 is a perspective view of a microwave vehicle detector according to the present invention.

Referring to FIG. 1, a perspective view of a microwave vehicle detector 10 according to the present invention is shown. Specifically, the microwave vehicle detector 10 is shown to be mounted in a "side-fire" position to a telephone or light pole 12. The microwave vehicle detector 10 includes a weather resistant enclosure 14 which is adjustable mounted to a bracket 16. In this regard, the enclosure 14 includes a pair of downwardly extending projections 18 and 20, and the bracket 16 includes an upwardly extending projection 22 which is interposed between the projections 18 and 20 of the enclosure 14. A bolt 24 extends laterally through each of the projections 18-22 to attach the enclosure 14 to the bracket 16, and to enable the angular position of the microwave vehicle detector 10 to be adjusted. The bracket 16 may be mounted to suitable structures such as the pole 12 via a plurality of bolt holes 26. Alternately, the bracket 16 may be mounted or suspended through the use of the adjustable metal band 28. Thus, it should be appreciated that the height, direction and angular position of the microwave vehicle detector 10 may be readily adjusted to suit the needs of the particular application.

In one embodiment according to the present invention, the enclosure 14 includes a top section 30, a bottom section 32, a back plate 34 and a front plate 36. The front plate 36 includes a generally rectangular aperture 38 for permitting the antenna of the microwave vehicle detector 10 to be directed toward the vehicle target area. In order to make the enclosure 14 more resistant to weather, a gasket may be interposed between the front plate 36 and the top and bottom sections of the enclosure. A suitable gasket may also be interposed between the back plate 34 and the top and bottom sections of the enclosure 14.

Figure 2A:
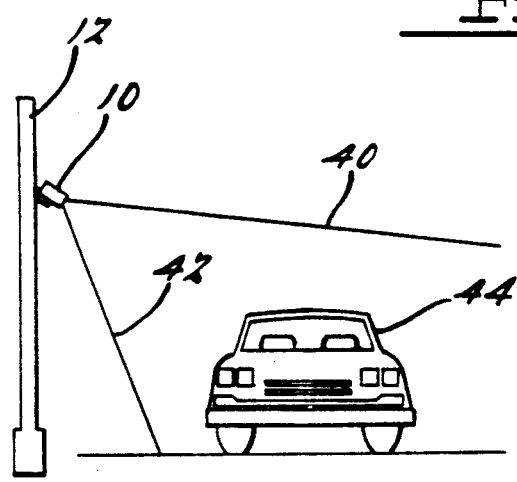
FIG. 2A illustrates a "side fire" mounting of the microwave vehicle detector shown in FIG. 1.

Referring to FIG. 2A, a side-fire mounting of the microwave vehicle detector 10 is shown. Specifically, the microwave vehicle detector 10 is shown to be suspended from the pole 12 in a downwardly angled position. The lines 40 and 42 illustrate that the microwave vehicle detector 10 will generate a relatively narrow beam of microwave energy which will define the vehicle target area. In this regard, a multiple passenger automobile 44 is shown to be present within the vehicle target area for auxiliary purposes. For an automobile size target, the microwave beam of the vehicle detector 10 will provide a detection pattern having the shape of a cone approximately 250 feet deep and 60 feet wide at the widest section of the cone. It should be understood that the detection range will be considerably larger when the size of the vehicle target is larger. Thus, for example, a pickup truck may be detected in a range of 300-350 feet. As will be appreciated from the description of the circuit diagrams of the circuit for the microwave vehicle detector 10 below, the range of the detection pattern may be adjusted during installation.

Figure 2B:
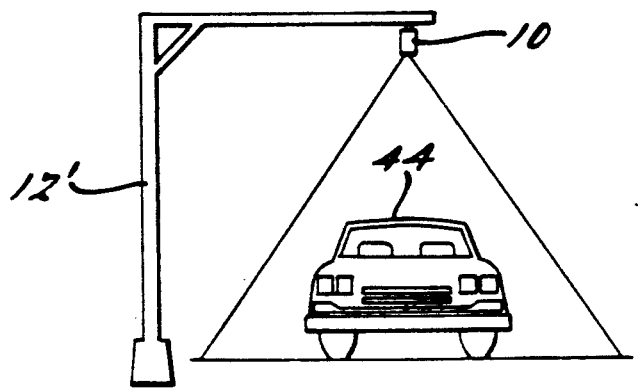
FIG. 2B illustrates an "over-head" mounting of the microwave vehicle detector shown in FIG. 1.

FIG. 2B illustrates an overhead mounting for the microwave vehicle detector 10. Specifically, the microwave vehicle detector 10 is shown to be suspended from a pole structure 12', such that the microwave beam of the vehicle detector is directed in a generally downward direction.

Referring to FIG. 2C, a top view of a four-way intersection 46 is shown. The intersection 46 is provided with four microwave vehicle detectors 48-54 according to the present invention. As shown in this Figure, each of these microwave vehicles detectors 48-54 are mounted in a side-fire position, such that the microwave beams generated by these detectors are directed towards oncoming traffic. For example, the microwave vehicle detector 48 generates the microwave beam 56 which defines the vehicle target area for that detector. In this regard, it should be noted that the microwave vehicle detectors 48-54 are mounted such that their respective beams extend across both the lanes of oncoming traffic and the lanes of traffic in the reverse direction.

While these microwave vehicle detectors would be mounted such that the microwave beams generated extend generally in a perpendicular direction to oncoming traffic, it is preferred that these units be mounted at an angle, such as shown in FIG. 2C. When the microwave vehicle detectors 48-54 are mounted at an angle to oncoming traffic which is less than 90 degrees, the effective range of these units will be greater than if the units were looking directly across oncoming traffic. It should also be appreciated that the range of the microwave vehicle detectors 48-54 will depend upon the size of the vehicle passing through its target area. Thus, for example, since it requires only a six inch square piece of metal to reflect as much microwave energy as a person, it should be appreciated that a truck will be a much better reflector of microwave energy than a car. Accordingly, the detection range of a truck is appropriately three times the range of a car. While speed may begin to have an effect on the range of the microwave vehicle detector at speeds in excess of sixty miles an hour, only about ten feet of range will be lost between sixty and seventy miles an hour.

Referring to FIG. 3A, a cross-sectional view of the top section 30 of the enclosure 14 for the microwave vehicle detector 10 is shown. Similarly, FIG. 3B provides a cross-sectional view of the bottom section 32 for the enclosure 14. In this particular embodiment, the top and bottom sections to the enclosure 14 are preferably extruded aluminum components, which from a generally rectangular cross-section when connected together. It should be noted, the top section 30 is a mirror image of the bottom section 32. The top section 30 includes a tongue 58 along one side and a groove 60 along the other side. Similarly, the bottom section 32 includes a tongue 62 along one side and a groove 64 along the other side. These tongue and grooves are complementary in shape such that the tongue 58 can be inserted into the groove 64 and the tongue 62 can be inserted into the groove 60 in order to rotate the top section 30 with the bottom section 32 of the enclosure 14.

Referring to FIG. 4, a block diagram of the circuit for the microwave vehicle detector 10 is shown. This microwave vehicle detector circuit is generally referred to by the reference numeral 66 The microwave vehicle detector circuit 66 includes an horn antenna 68 which has a gain of approximately 16 dB and is preferably adapted to provide a narrow microwave beam. An example of such a suitable antenna is that currently used on a "TC-20" vehicle detector manufactured by the assignee of the present invention.

The circuit 66 also includes a detector diode block 70 and a transceiver block 72. The transceiver 72 may be any suitable microwave transmit and receive unit which is appropriate to this application. For example, in one embodiment according to the present invention the transceiver unit 72 is a (Model GOS -2565) transceiver manufactured by Alpha Industries. This transceiver includes a GUNN diode (which transmits a CW microwave signal at a frequency of 10.525 Ghz $+/-25$ Mhz at a power level typically 5 to 7 milliwatts), and two detector diodes 70 and 71. However, it should be appreciated that other transceivers may be used in the appropriate application. A transceiver with two detector diodes is necessary for detecting motion of a target towards or away from the unit. The second receiver or detector diode is needed to discriminate between motion directed away from the unit and motion directed towards the unit. If the signal derived from diode 70 is defined a channel 1 and the signal derived from diode 71 is defined as channel 2, in the case where the motion of the detected target is towards the sensor, the channel 2 signal will lead the channel 1 signal by approximately 90 degrees. If the motion is away from the sensor then the channel 1 signal will lead the channel 2 signal by approximately 90 degrees. In other words, if channel 2 is high when channel i is on its rising edge, the vehicle is moving towards the detector. Conversely, if channel 2 is low when channel 1 is on its rising edge, the vehicle is moving away from the detector. While a phase difference of 90 degrees is preferred, a phase difference between 60 degrees and 90 degrees is sufficient to permit the discrimination of motion towards or away from the microwave vehicle detector 10.

The microwave vehicle detector circuit 66 includes a preamplifier 74 which receives the doppler shift signal from detector diode 70, and a preamplifier circuit 76 which receives the doppler shift signal from detector diode 71. These doppler signals represent low frequency audio difference signals which vary in accordance with the speed of a moving target within the detection range. In the event that there is no movement with the detection range, the preamplifiers will simply receive a "noise" input. The preamplifiers 74 and 76 each provided a fixed gain of 26 dB. The signal from the preamplifier section 74 is coupled to amplifier section 78 which provides a selectable gain of either 37 dB or 40 dB. Similarly, the signal from the preamplifier section 76 is coupled to amplifier section 80 which also provides a selectable gain of either 37 dB or 40 dB. The high/low gains of amplifier 78 and amplifier 80 are both adjusted simultaneously by the range control 84. The high gains provided by the preamplifier stages 74 and 76 and the amplifier stages 78 and 80 amplify signals that may be close to the noise threshold, but can be distinguished from noise with the analysis performed by a microprocessor 98. The amplified doppler phase shift signals from the detector diodes are then respectively transmitted to the comparators 86 and 88.

The comparators 86 and 88 transform the doppler shift frequency signals from the amplifier sections to square wave signals for further processing by separate wave shaping circuit. In accordance with the present invention, the comparators 86 and 88 will trigger at a signal level which is only two times the magnitude of noise when there is no movement in the detection range. The square wave shapers 92 and 96 invert the square wave outputs from comparators 86 and 88 as well as reduce the amplitude from 8 V to a standard TTL level of 5 V. The processed square wave signals generated by the square wave shapers 92 and 96 are transmitted to a direction selector switch 94 which causes the microwave vehicle detector circuit 66 to respond only to vehicle movement in a predetermined direction. In other words, the microwave vehicle detector 10 will only detect motion toward or away from its position, and ignore motion in the opposite direction. The two signals from the direction selector switch 94 are then transmitted to microprocessor 98, which monitors and analyzes these square wave signals. By analyzing the phase difference between these two signals, microprocessor 98 causes the control relay 104 to initiate a change in the relay contacts of block 104. A direction-/activity LED (LED8) in the relay and LED driver block 104 will also be caused to blink, and a relay indicator (LED2) will illuminate. Microprocessor 98 also analyzes the speed of the target and displays the data through to series of LEDs (Bar graph Speed display 100) to indicate the speed of the vehicle being detected. The microprocessor also accepts a signal transmitted from a trouble display 90 which operates to trigger the deactivation of a relay 104, as discussed below.

In accordance with the preferred embodiment of the present invention, relay 104 will normally be in an activated or energized state, and the microprocessor 98 will operate to deactivate the relay for a desired hold time in response to motion detected in the predetermined direction. Block 102 is a speed information interface which provides an output to an external processing device, such as a microcomputer. In accordance with the present invention, the microwave vehicle detector circuit 66 includes a detector monitor circuit 82 for the detector diodes. This detector monitor circuit 82 operates to monitor the voltage bias level of the detector diodes, and to signal microprocessor 98 when either of these voltage bias levels has dropped to a predetermined threshold. In other words, the detector monitor 82 sends a flag to microprocessor 98 to deactivate the output when the voltage bias level on either of the detector diodes has dropped below a level desired for proper operation.

The "Relay and LED driver" 104 circuit is connected to a traffic controller which is capable of discriminating between the activation and deactivation times of the relay. When traffic is being monitored, the led blinks in a random fashion determined by the amount of traffic. In contrast, when the voltage bias level on either of the detector diodes drops to a predetermined threshold, microprocessor 98 will trigger LED driver 104 to blink at a frequency of 3 Hz until the failed diode is replaced. If the microwave vehicle detector experiences a loss of electrical power, the LED driver will be deactivated for an extended period of time, which will alert the central traffic controller to a power loss with the unit. Thus, it should be appreciated that the microwave vehicle detector circuit 66 need generate only a single output signal to monitor both traffic movement and its own operation.

Figure 5A:
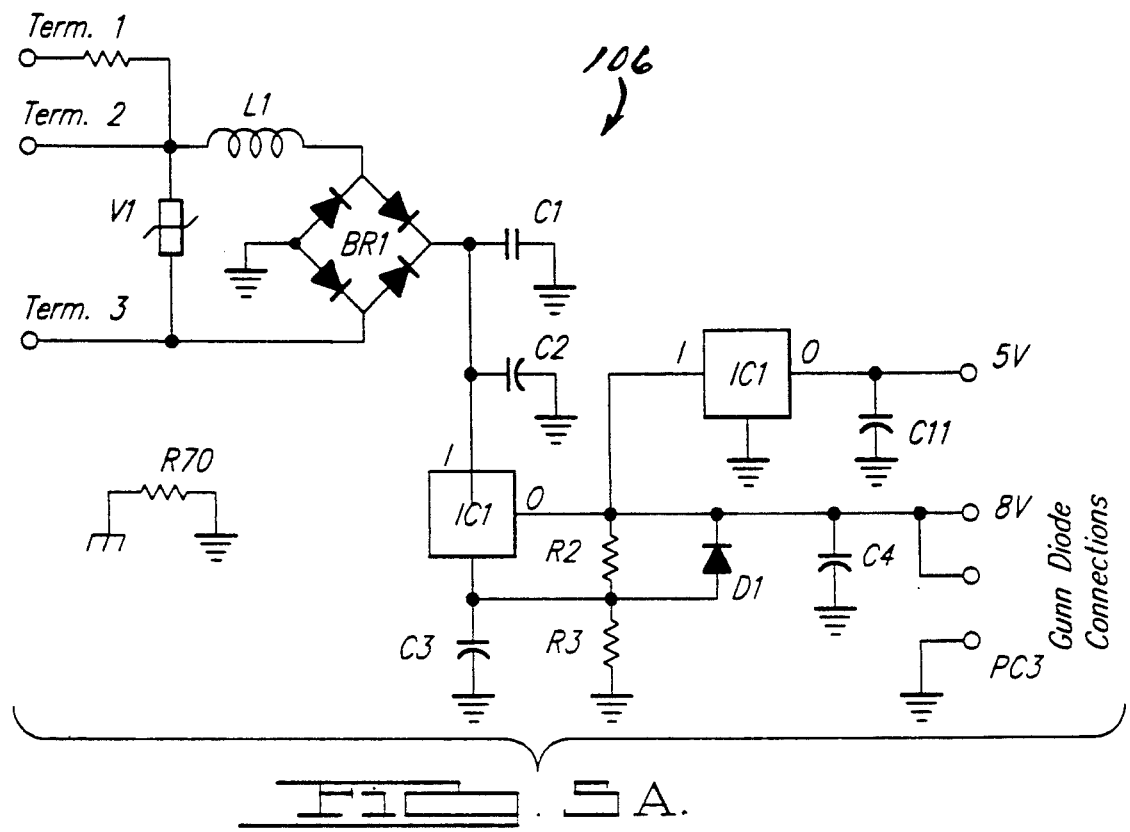
Figure 5A:
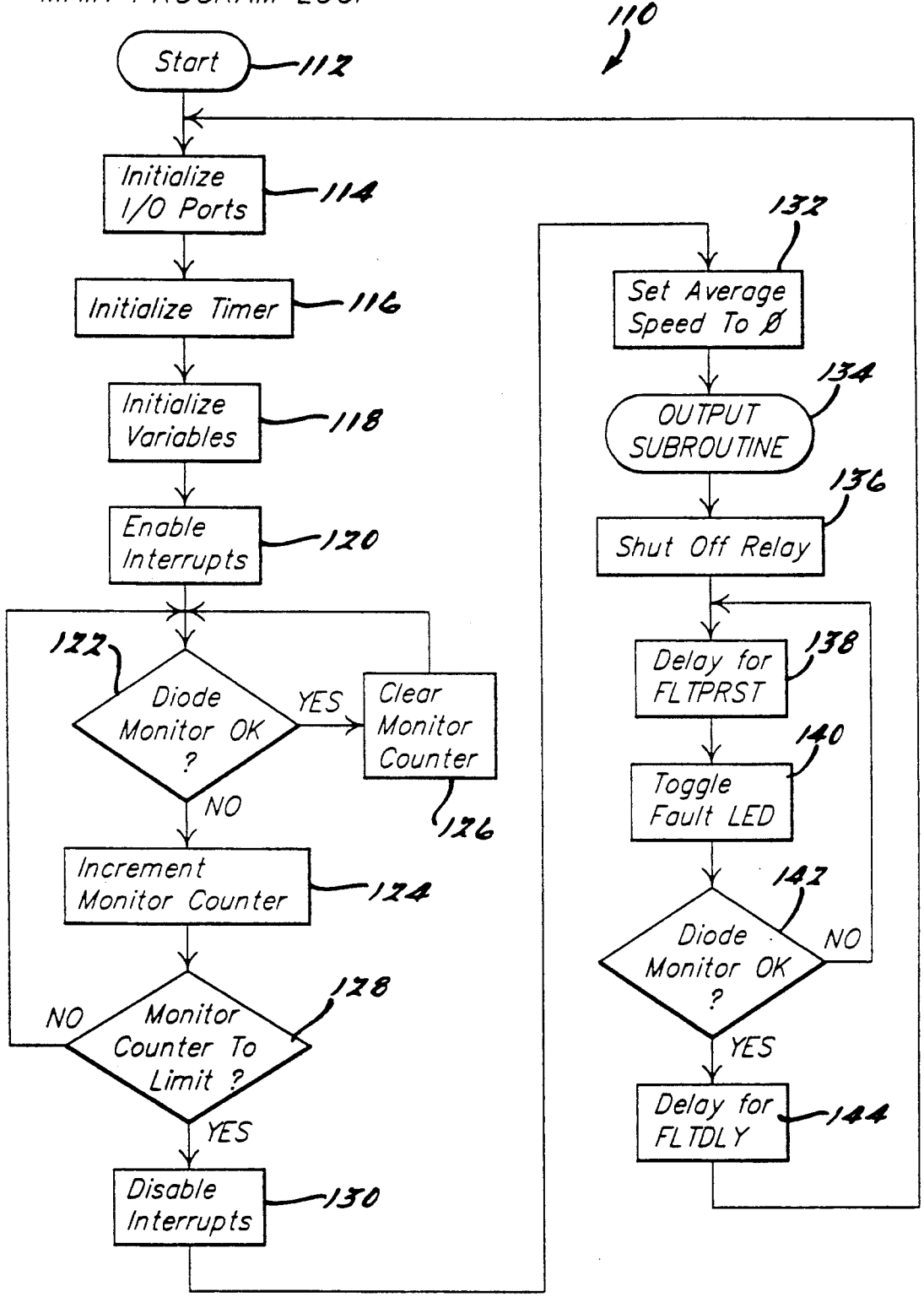
Figure 5C:
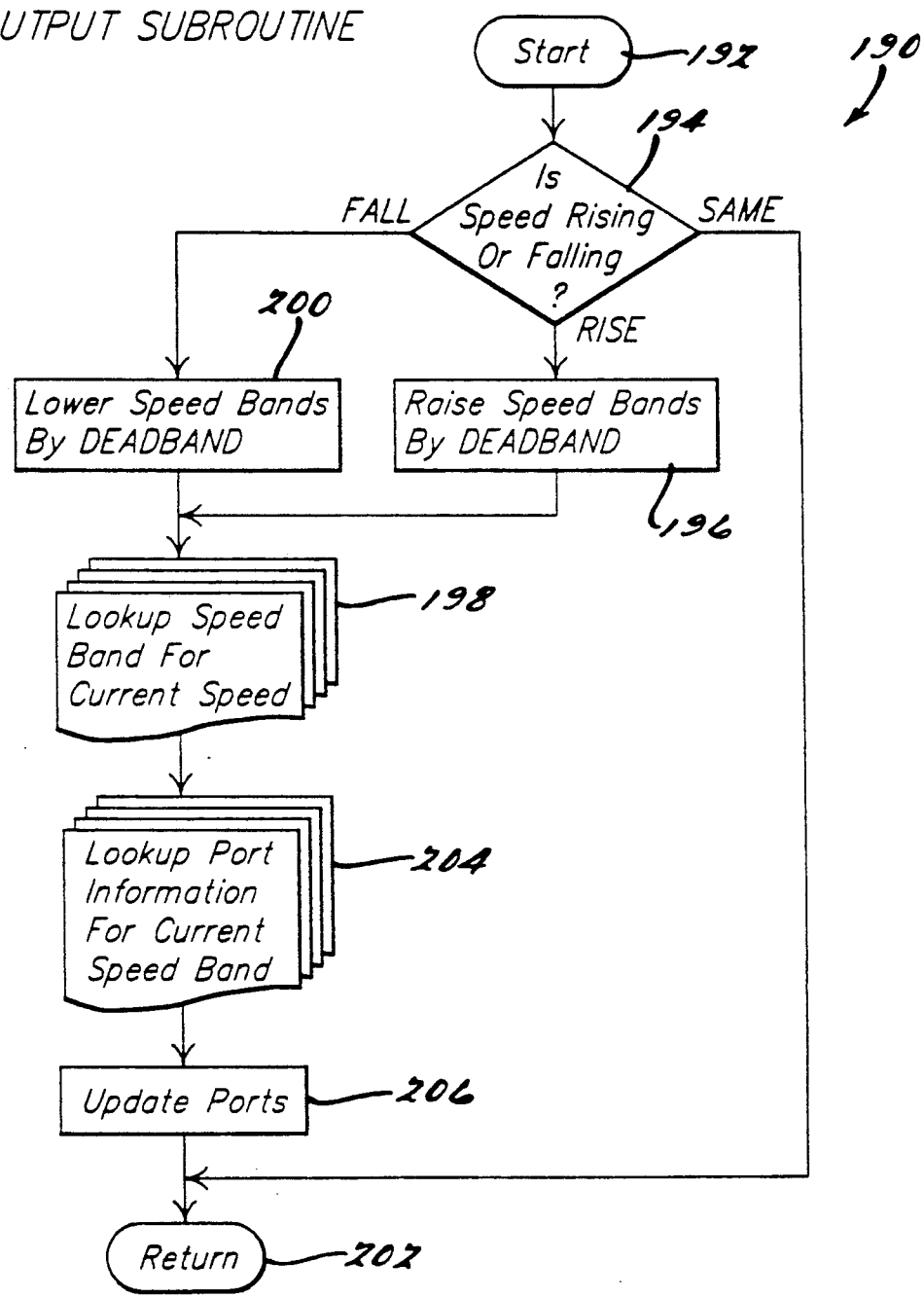
Figure 8D:
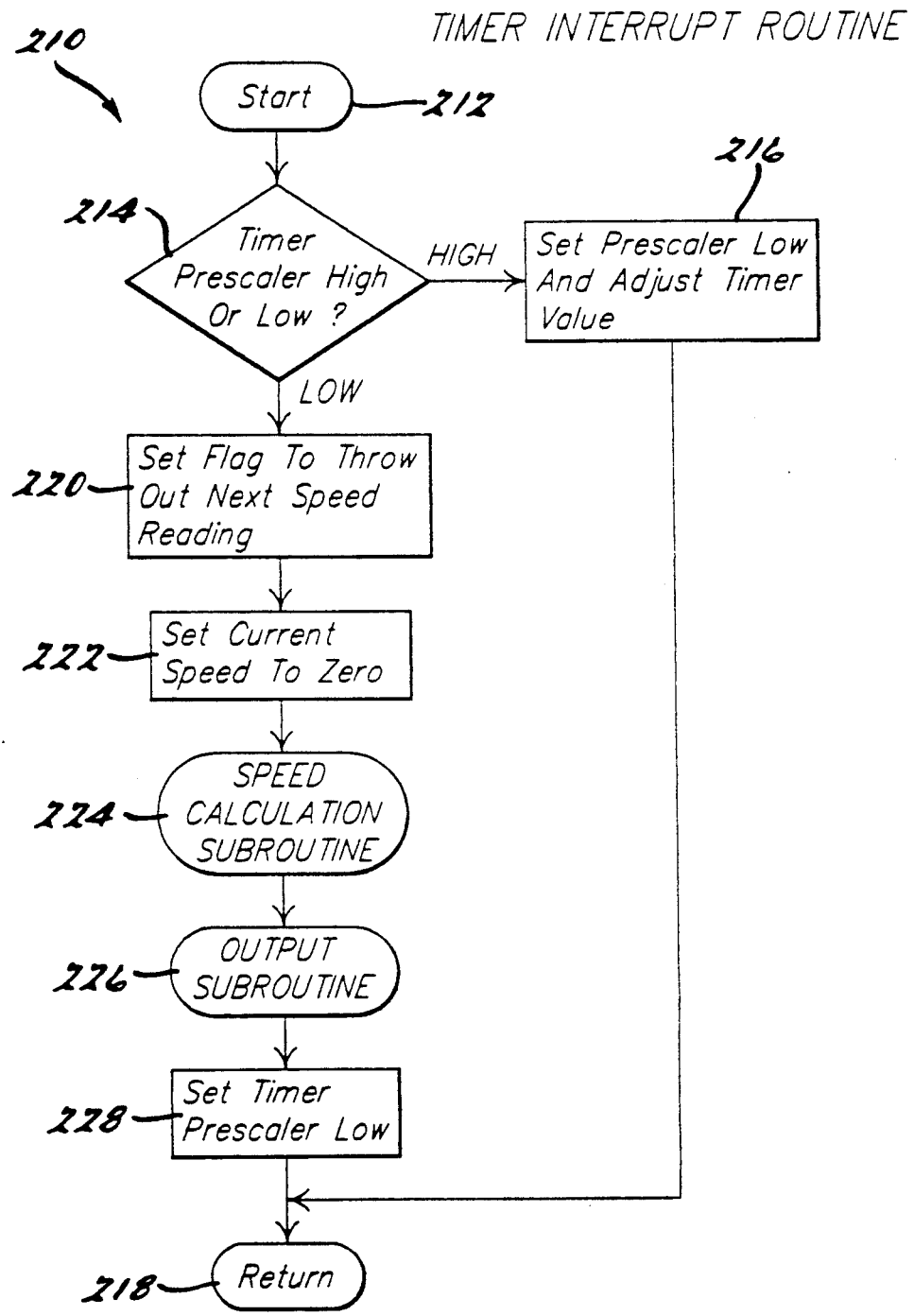

Referring to FIGS. 5A, 5B, and 5C a schematic diagram of the microwave vehicle detector circuit 66 is shown. In this regard, FIG. 5A illustrates the power supply circuit 106 which is used in the unit. The power supply circuit 106 is used to transform an input voltage of 10–24 VAC down to an 8 volt DC level used in the rest of the circuit. Referring specifically to FIG. 5B, terminal "PC1" is used to receive the doppler shift signal from detector diode 70. Similarly, a terminal labeled "PC2" is used to receive the doppler shift signal from detector diode 71. The preamplifier 74 is shown to be comprised of transistor Q2 (2N5232) which is connected in a voltage amplifier mode. Similarly, preamplifier 76 is shown to be comprised of transistor Q1(2N5232). The preamplifier 74 is connected to the amplifier 78. A similar connection is also provided for the preamplifier 76 and the amplifier 80.

Amplifier block 78 is shown to be comprised of an operational amplifier IC2c (¼ of a LM324) to produce a gain of either 37 dB or 40 dB. Amplifier 78 uses resistors R6, R68 and capacitor C8 in a parallel configuration in the feedback loop to produce a gain of 37 dB. Resistor R68 can be removed from the feedback loop by opening switch S1-A to produce a gain of 40 dB. Amplifier 78 is AC coupled to transistor Q2 in preamplifier block 74 through capacitor C33. Amplifier 80 is shown to be comprised of an operational amplifier IC2d, and is AC coupled to the preamplifier 76 in a similar fashion using capacitor C35. Amplifier 80 uses resistors R22 and R69, and capacitor C18 in a parallel configuration in the feedback loop to produce a gain of 37 dB. Resistor R69 can be removed from the feedback loop by opening switch S1-B to produce a gain of 40 dB. Switches S1-A and S1-B are controlled by range control 84 and are thrown at the same time, providing simultaneous gain switching of amplifier 78 and amplifier 80.

Comparator 86 is shown to be comprised of IC2b (¼ of a LM324). The output of the amplifier 78 is AC coupled to comparator 86 through capacitor C9 and resistor R7. A network of resistors R8, R9, and R12 is also connected to the negative input of comparator 86 to establish a preferred reference voltage (e.g., 4 V) at the input. Similarly, comparator 88 is shown to be comprised of IC2a (¼ of a LM324). The output of amplifier 80 is AC coupled to comparator 88 through the capacitor C19 and resistor R23. A network of resistors R24, R25, and R28 is also connected to the negative input of comparator 86 to establish a preferred reference voltage (e.g., 4 V) at the input. The signals from comparators 86 and 88 are square waves with an amplitude of 8 V.

The square wave shaper 92 is shown to be comprised of an AND gate IC5a. The output of the comparator 86 is coupled to the square wave shaper 92 through a voltage divider comprised of resistors R13 and R14. Similarly, the square wave shaper 96 is shown to be comprised of an AND gate IC5b. The output of the comparator 88 is coupled to the square wave shaper 96 through a voltage divider comprised of resistors R21 and R29. The voltage divider circuits reduce the amplitude of the square waves from 8 V to 5 V, the level required by microprocessor 98.

Direction selector switch 94 is shown to be comprised of double throw SW2 (Alco TSS21PG). However, it should be appreciated that other suitable switches may be used in the appropriate application.

The microprocessor 98 is shown to be comprised of IC6 (MC68705P3). The doppler signal inputs are derived from the mixer diodes 70–71. These signals will only be present when a target is moving in the detection range of the microwave detector 10. Once these signals are conditioned and amplified, they will each be a square wave at a frequency of approximately 31 HZ for each mile per hour the target is moving.

Port PC0 of the microprocessor 98 is connected to the mixer diode monitoring circuit 82. The output line from monitoring circuit 82 is normally high unless there is a fault with one or both of the microwave mixer diodes 70–71 where this line will be pulled low. Under normal operating conditions port PC0 may go low for a short period. However, if this port PC0 remains low for longer than 3 or 4 seconds, microprocessor 98 will cause the relay coil K1 to be de-energized and cause indicator LED2 to blink at a rate of 3 Hz, indicating trouble with one or both of the mixer diodes 70 and 71.

The monitoring circuit 82 is shown to include a comparator for each of the detector diodes, namely comparator "IC3a" for the channel 1 detector diode and comparator "IC3b" for the channel 2 detector diode. One input to comparator IC3a is connected to the channel 1 detector diode through a voltage divider comprised of resistors R36 and R53. This voltage divider enables the negative voltage on the detector diode to merely affect the offset of the 8 V supply provided to the voltage divider resistors. The comparator IC3b is also coupled to the channel 2 detector diode through a corresponding voltage divider. Each of the comparators IC3a–IC3b also receive a reference voltage input which will permit the output signal from these comparators to change states at approximately one half the normal bias voltage provided to the detector diodes. Such a change in the output state of either of these comparators will cause a transistor Q3 to switch conductive states, and thereby turn on LED1 (e.g., trouble display 90).

Output port PC1 of the microprocessor 98 is tied to indicator LED8 which is normally low, but goes high to indicate a target is detected. The indicator LED8 will illuminate whenever a target is detected for at least 0.5 seconds. Output port PC2 is tied to the indicator LED2, which is responsive to the monitor circuit 82.

Output port PC3 is connected to a transistor Q4 which is used to energize or de-energize relay K1. In the standby state this line normally remains high. When a moving target is detected or if trouble occurs, indicated by Port PC0 remaining low, port PC3 is pulled low. If the trouble signal restores to normal and/or there is no detection of a vehicle after a 1 second time out, this line should return high.

Output port PB2 is tied to a jumper "JP1", which permits the output speed signals from the microprocessor 98 to be calibrated in either mph or kilometers/hour.

Output port PB3 provides a signal which represents that the target is traveling between 2 mph and 35 mph. Port PB3 is normally low, except when a target is detected traveling over 2 mph but below 36 mph, then this port goes high.

Similarly, port PB4 provides a signal which represents that the target is traveling between 36 mph and 45 mph. Port PB4 is normally low, except when a target is detected traveling over 35 mph but below 46 mph, then this port goes high.

Similarly, port PB5 provides a signal which represents that the target is traveling between 46 mph and 55 mph. Port PB5 is normally low, except when a target is detected traveling over 45 mph but below 56 mph, then this port goes high.

Similarly, port PB6 provides a signal which represents that the target is traveling between 56 mph and 65 mph. Port PB6 is normally low, except when a target is detected traveling over 55 mph but below 66 mph, then this port goes high.

Similarly, port PB7 provides a signal which represents that the target is traveling between 66 mph and the maximum speed for which the microwave detector 10 is programmed to respond to (e.g., 85 mph). Port PB7 is normally low, except when a target is detected traveling over 66 mph, then this port goes high.

Port PA0 is normally high in the standby state until a target is detected with a speed between 2 mph and 35 mph, where this output is pulled low.

Similarly, port PA1 is normally high in the standby state until a target is detected with a speed between 36 mph and 45 mph, where this output is pulled low.

Similarly, port PA2 is normally high in the standby state until a target is detected with a speed between 46 mph and 55 mph, where this output is pulled low.

Similarly, port PA3 is normally high in the standby state until a target is detected with a speed between 56 mph and 65 mph, where this output is pulled low.

Similarly, port PA4 is normally high in the standby state until a target is detected with a speed over 65 mph, where this output is pulled low.

The output of ports PB3-PB7 are designed to act as a bar graph display with each segment sequentially driving a series of indicating lights (LED3-7) to indicate target speed. The output ports PA0-PA4 differ from the output ports PB3-PB7 in that only one of the ports PA0-PA4 will give an output at any given time while the signals from ports PB3-PB7 will combine to provide an output display.

The bar graph speed display 100 is shown to be comprised of inverter buffer circuitry IC7c-g and indicators LED3-7. The indicators LED3-7 are arranged in a row to represent a bar graph representing the speed of the vehicle being detected. Indicator LEDs 3-7 are driven by ports PB3-PB7.

The speed information interface 102 is shown to be comprised of inverter buffer circuitry IC8a, IC8b, IC8c, IC8f, and IC8g that drives output terminals 7-11 which are available to an external monitoring device, such as a microcomputer. Buffer circuits IC8a, IC8b, IC8c, IC8f, and IC8g are driven by ports PA0-PA4.

The relay and LED driver 104 is shown to be comprised of inverter buffer circuitry IC7a and b, indicators LED2 and LED8, and relay K1. Buffer circuit IC7a is coupled to port PC1 of microprocessor 98. Similarly, buffer circuit IC7b is coupled to port PC2 of microprocessor 98. The relay K1 is normally energized in the standby state.

FIGS. 6a-6e are flow charts outlining the steps performed by the microprocessor 98 in accordance with the present invention. Referring to FIG. 6a, the main program 110 starts with oval 112 and continues with rectangle 114 where the input/output ports are initialized. The software represented by rectangle 116 initializes the timer which is internal to the microprocessor 98, while rectangle 118 initializes the variables. For example, one of the initialized variables is a flag which is set to throw out the "next" reading, as will be explained below. Then, rectangle 120 enables interrupts to be processed by the microprocessor 98. Diamond 122 determines whether the diodes are functioning properly. If the diodes are not functioning properly, rectangle 124 increments the monitor counter. If the diodes are functioning properly, rectangle 126 clears the monitor counter before diamond 122 checks the diodes again. If the diodes are functioning properly, the loop between diamond 122 and rectangle 126 will continue until an interrupt request is detected. The microprocessor 98 will generally remain in this monitoring loop during times when no vehicle movement is detected by the diodes 70-71. Diamond 128 determines if the monitor counter exceeds a predetermined limit. This monitor counter limit is used to distinguish between momentarily perceived failures (e.g., a bias level drop for less than 1.5 ms) and an actual detector diode failure. If the monitor counter does not exceeds the limit diamond 122 checks the diodes again, repeating the cycle. Once the monitor counter reaches the predetermined limit, rectangle 130 disables the interrupts. This counting loop permits a period of time for the microprocessor to read the output from the monitor circuit 82 in order to accurately detect whether the detector diodes 70-71 are functioning properly.

Continuing through the flow chart, rectangle 132 sets an average speed variable to zero before calling output subroutine oval 134 (to be described in connection with FIG. 6C). Since the average speed is zero before the output subroutine is called the output subroutine will turn off all LED and output signals indicative of target speed. Rectangle 136 shuts off the relay before rectangle 138 calls a delay for the time value held in the Fault Present variable "FLTPRST". Continuing through the flow chart, rectangle 140 toggles the fault indicator (LED2 from FIG. 5C). Diamond 142 checks to see if the diodes are functioning properly, similar to diamond 122. If the diodes continue to not function properly, the routine is returned to rectangle 138. Blocks 138-142 let the microprocessor continue to monitor the diodes once they have gone into fault mode allowing the circuit to recover from temporary problems. Rectangle 138, 140 and 142 provide the error sequence displayed by indicator LED2. If the diodes return to proper functioning modes, rectangle 144 delays for the predetermined constant "FLTDLY" before being returned to the initialization rectangle 114.

Referring to FIG. 6b, a speed calculation subroutine is shown. The speed calculation subroutine uses new timer data to point to the current speed of a target vehicle. The speed calculation subroutine 146 starts with oval 148 and continues to diamond 150 which checks if the timer prescalar (to be described in connection with the timer interrupt routine) is high or low. If the timer prescalar is high, the speed is looked up in high table 152 for saved timer values. If the prescalar is low, then the speed is looked up in low table 154 for saved timer values. Diamond 156 determines if the current speed of the target is higher than the speed limit constant "SPDLMT". This constant represents the upper speed limit for which a speed calculation will be made (e.g., 85 mph). If this upper speed limit is exceeded, then the execution of the speed calculation subroutine is terminated with return oval 158, and the stored "average" speed is unaffected. If the upper speed limit is not exceeded, diamond 160 compares how the current speed compares to the stored average speed. If the current speed is below the average, diamond 162 determines if the speed is within a "WINDOW" constant of permitted speed variation. In one form of the present invention, this WINDOW constant preferably provides a +/− 5 mph speed range. This is because the microwave vehicle detector repeatedly evaluates a moving target at a very rapid rate. If the current speed is the same as the average speed, rectangle 164 decrements an "out of range" counter (unless it is already at zero) and terminates the execution of the speed calculation with return oval 158. The out of range counter is used to throw out spurious signals, such as when a vehicle is being tracked at 42 mph and the current speed indicates a sudden change to 65 mph. If the current speed is above the average speed, diamond 166 also determines if the speed is within the WINDOW constant of permitted speed variation. If diamond 166 determines the current speed is not within the WINDOW constant range, rectangle 168 increases the out of range counter by a predetermined counting constant "UP_INC". UP_INC is defined as down limit "DWNLIMIT" (e.g. 70) divided by up limit "UPLIMIT"(e.g.(10). In this regard, the UPLIMIT value determines how soon the microprocessor 98 will start tracking a higher vehicle speed, and the DWNLIMIT value will determine how soon the microprocessor will start tracking a lower vehicle speed (e.g. zero) after vehicle movement is no longer detected. If diamond 162 determines the current speed is not within the WINDOW constant range, then rectangle 163 increases the out of range counter by one. If diamond 162 determines the current speed is within the WINDOW constant range then rectangle 170 increments a decreasing speed counter before diamond 172 determines if the counter equals the value held in the decreasing speed filter "DECRATE". If diamond 172 finds the counter is equal to the value held in "DECRATE", rectangle 174 resets the counter and the decrements the average speed by 1 mph. While not shown, the software represented by rectangle 174 also sets a flag for the microprocessor 98 to show that vehicle speed is decreasing. Rectangle 164 then decrements the out of rang counter and ends the execution of the speed calculation subroutine with return oval 158. If diamond 172 finds the counter is not equal to the value held in "DECRATE", rectangle 164 decrements the out of range counter and ends the execution of the speed calculation subroutine with return oval 158. If diamond 166 finds the current speed within the WINDOW constant range, rectangle 176 increments the increasing speed counter before diamond 178 determines if the counter is equal to the value held in "INCRATE" (e.g., 10 samples). If diamond 178 determines the counter is not equal to the value held in "INCRATE", rectangle 164 decrements the out of range counter and ends the execution of the speed calculation subroutine with return oval 158. If diamond 178 determines the counter is equal to the value held in "INCRATE", rectangle 180 resets the counter and increments the average speed variable by 1 mph. Rectangle 180 is also used to set an increasing speed flag for the microprocessor 98. Rectangle 164 then decrements the out of range counter and ends the execution of the speed calculation subroutine with return oval 158. From the above description, it should be appreciated that the DECRATE and INCRATE values smooth out changes in the vehicle speed displays, even though the microprocessor has determined that the vehicle speed has actually gone up or down. Thus, for example, it will take 10 samples in a row of increasing speed before the average speed value is increased.

Finally, after rectangle 168 increases the out of range counter by the counting constant "UP_INC", diamond 182 determines if the counter is equal to the constant "DWNLIMIT". The DWNLIMIT constant determines the number of samples required to shift the average speed value down. If diamond 182 determines if the counter is equal to the "DWNLIMIT" constant, rectangle 184 resets the counter, saves the current speed as the average speed and ends the execution of the speed calculation subroutine with return oval 158. If diamond 182 determines the counter is not equal to the "DWNLIMIT" constant, the execution of the speed calculation subroutine is ended with return oval 158.

Referring to FIG. 6C, a flow chart of the output subroutine is shown. This subroutine updates the output signals from the microprocessor 98 based upon the average speed value. The output subroutine 190 starts with oval 192 and continues to diamond 194 which determines if the speed is rising or falling. This determination is made from the flags set in rectangles 174 and 180 in FIG. 6B. If the average speed is rising, rectangle 196 raises the speed band by the constant value "DEADBAND" before looking up the speed band for the current speed in table 198. The "DEADBAND" constant provides a band hysteresis for permitted output signal changes, such as +/−2 mph. If the speed is falling, rectangle 200 lowers the speed band by the "DEADBAND" value before looking up the speed band for the current speed in table 198. This provides protection against the output bargraph oscillating between two speed bands when a vehicle is passing from one speed band to the next. If the average speed has not changed the execution of the output subroutine is terminated with return oval 202. After table 198 looks up the speed band for the current speed, table 204 looks up the port information for the current speed band. Rectangle 206 concludes the output subroutine by updating the ports and proceeding to return oval 202.

Referring to FIG. 6D, a flow chart of the timer interrupt routine is shown. The timer interrupt routine is used to set up a time base reference to perform all calculations. This timer interrupt routine is executed whenever the timer counter overflows. The timer interrupt routine 210 starts with oval 212 and continues to diamond 214 which determines if the prescalar is high or low. The prescalar is a value by which the microprocessor clock frequency is divided. The timer prescalar determines whether the microprocessor should be in high speed or low speed mode. The high speed mode is used to calculate speeds above 30 mph, while the low speed mode is used to calculate speed below 30 mph. In this way, the microprocessor will be able to switch between high speed and low speed data tables, as shown in the speed calculation subroutine. By using two different resolutions, the speeds in both the upper range and lower ranges can be calculated more accurately than if some intermediate resolution were utilized for all speeds. If the prescalar is high, rectangle 216 sets the prescalar to low and adjusts the timer value before the execution of the interrupt routine is terminated with return oval 218. If the prescalar is low rectangle 220 sets a flag to throw out the next speed reading before rectangle 222 sets the current speed to zero. Oval 224 calls the speed calculation subroutine before oval 226 calls the output subroutine. Rectangle 228 sets the timer prescalar low before execution of the interrupt routine is terminated with return oval 218.

It should be understood from the above that the microprocessor 98 is programmed to provide a free running timer which will enable an accurate measurement of the amount of time between selected edges of a doppler signal input (e.g., the falling edges). In one form of the present invention, the timer is programmed to count down to zero from an initial value (e.g., 255). This initial timer value is set by the target interrupt routine to be discussed below. In any event, it should be understood that the timer interrupt routine will be called whenever the timer value has reached zero. Thus, if the prescalar is low and the timer interrupt occurs, then the speed reading will be below 2 mph. Accordingly, the current speed is set to zero in rectangle 220. If the prescalar is set low, and the vehicle speed is between 2 mph and 30 mph, then the target interrupt signal will be received by the microprocessor 98 and the target interrupt routine will be called instead of the timer interrupt routine. As indicated by rectangles 216 and 228, the timer interrupt routine 210 will always set the prescalar low before exiting.

Referring to FIG. 6E, a flow chart of the target interrupt subroutine is shown. The target interrupt subroutine is used to determine if the target is traveling in the predetermined direction and which speed resolution to use. The target interrupt routine 230 starts with oval 232 and continues to diamond 234 which determines if the target is moving in the correct direction relative to the position of the direction selector switch 94.

It this regard, the doppler signals from both of the detector diodes will be examined. However, as each of these signals have the same frequency, only one of these signals is needed to determine the speed of a vehicle moving within the detection range. Thus, in one form of the present invention, only one of these two signals is used to trigger the target interrupt signal to the microprocessor for speed calculation purposes. Additionally, it should be noted that this interrupt only occurs on the falling edge of the selected doppler input signal.

If the target is not moving in the correct direction, rectangle 236 sets the flag to throw out the next speed reading before execution of the target interrupt routine is terminated with return oval 238. If the target is moving in the correct direction, diamond 240 checks to see if the flag is set to throw out the next speed reading. If the flag is set to throw out the next speed reading, rectangle 242 clears the flag before execution of the target interrupt routine is terminated with return oval 238. If the flag is not set to throw out the next speed reading, rectangle 244 saves the timer value in memory, sets the prescalar high, and resets the timer before rectangle 246 decrements the LED toggle counter.

This saved timer value is subsequently utilized in the speed calculation subroutine to find the current vehicle speed value in either the high speed or low speed data table. From the above description it should be appreciated that when a vehicle begins entering the detection range, the microprocessor will receive an interrupt and respond by calling the target interrupt routine. However, the next speed reading will be thrown out, as this flag is set in the initialization rectangle 118 of FIG. 6A. Accordingly, rectangle 240 will clear this flag, so that the next speed reading will be registered and the microprocessor 98 will begin to count up to the number of speed readings required to change the average speed value from an initial zero value. In other words, the timer value between the second and third doppler signal falling edges will be used to calculate the first current speed value.

Continuing, diamond 248 determines if the toggle counter is equal to zero. If it is, rectangle 250 resets the LED toggle and LED counter before executing the speed calculation subroutine 252 and the output subroutine 254. If the toggle counter is not equal to zero, diamond 248 executes the speed calculation subroutine 252 and the output subroutine 254 before execution of the target interrupt routine is terminated with return oval 238. It should be appreciated from the above that the loop created by diamond 248 and rectangle 250 enables the cycling of LED 8 to be directly related to the vehicle speed detected.

Figure 7:
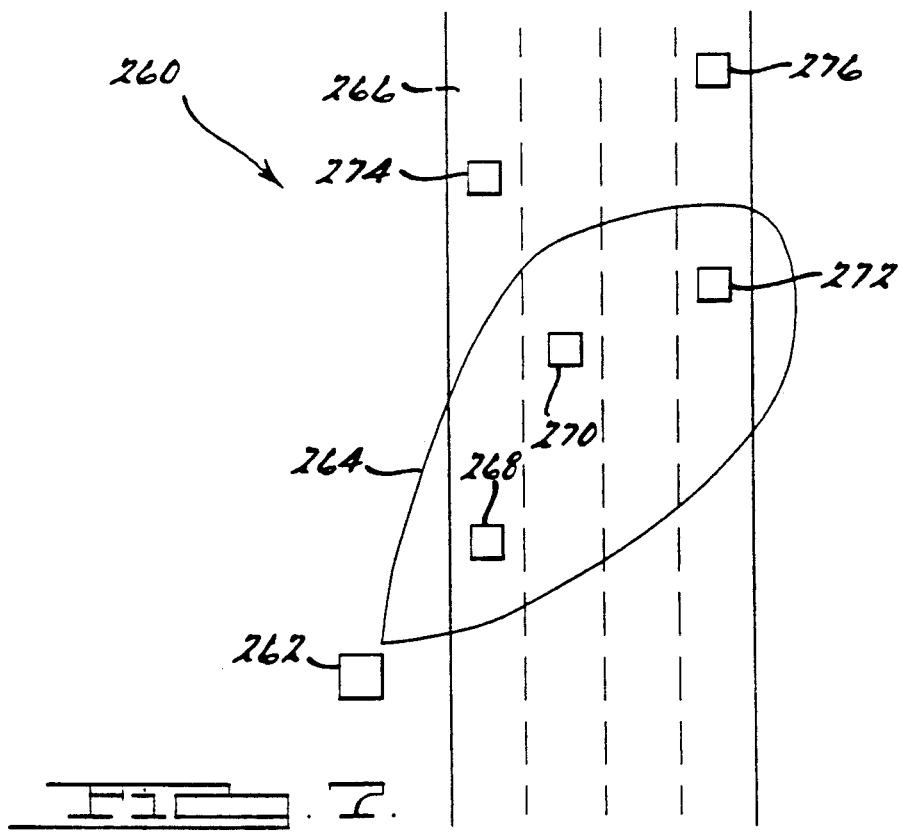
FIG. 7 illustrates the use of a microwave vehicle detector to cover four lanes of traffic.
Figure 8B:
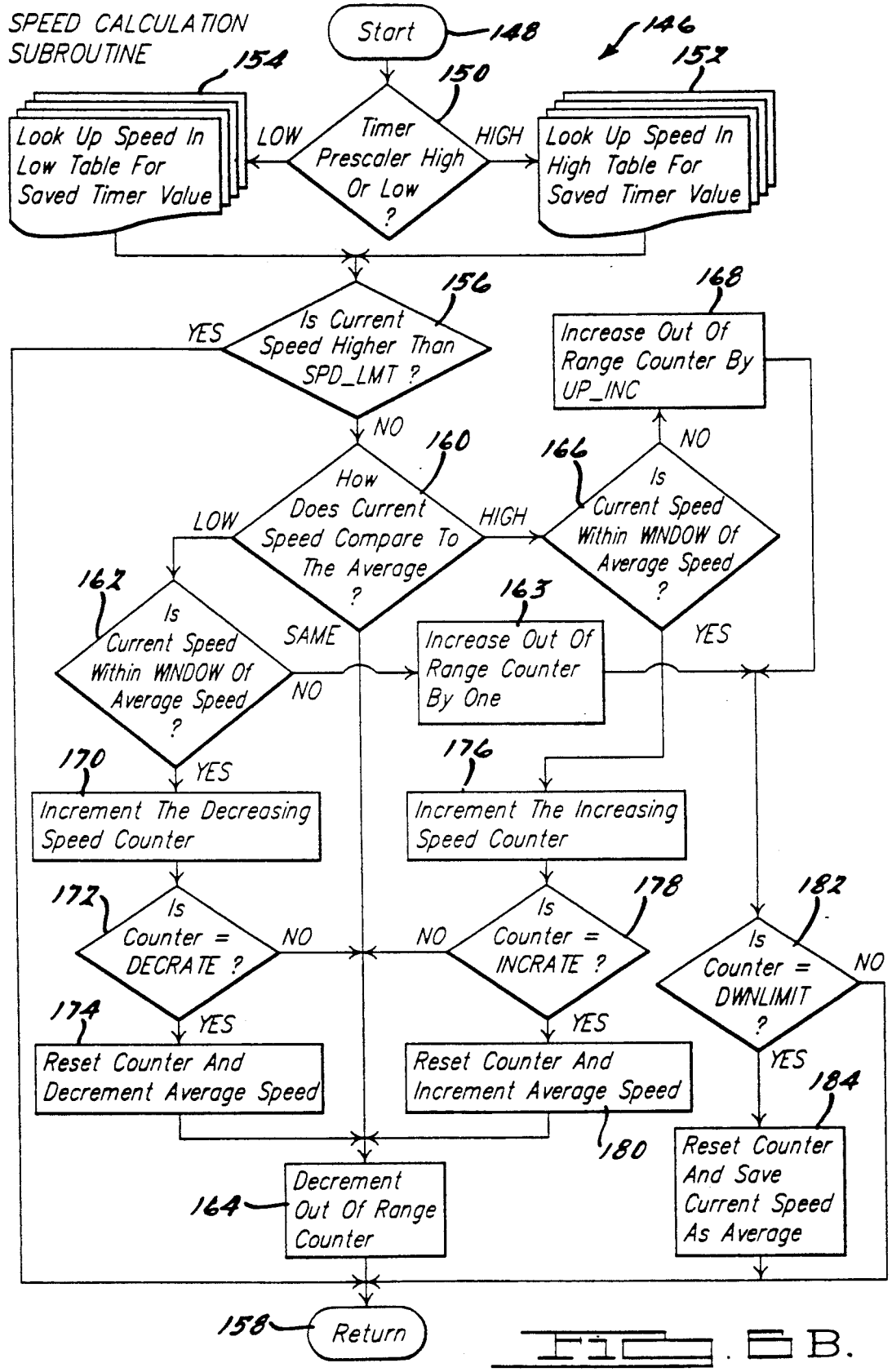

Referring to FIG. 7, the microwave vehicle detector 10 is shown to project a pattern 264 across a four lane highway 266. Vehicles 268, 270 and 272 are within the range of the projected pattern 264, while vehicles 274 and 276 are outside the projected pattern and will not effect the outputs of the vehicle detector 262. The microwave vehicle detector 10 responds only to the strongest signal within the projected pattern 264. When a vehicle enters the pattern 264, the vehicle detector 262 will lock onto the signal in 10 microwave pulses (i.e., 10 speed readings), and hold the signal for approximately 70 pulses after the vehicle leaves the pattern 264. The vehicle detector locks onto a vehicle extremely fast and continues to be locked during any momentary dropouts in the signal, providing these dropouts do not exceed 70 pulses. It should be appreciated that since the microprocessor 98 can lose the signal for up to 70 microwave pulses, the range of the microwave vehicle detector is greatly increased. The microprocessor 98 can track a signal far earlier without increasing the power to the transceiver, thus increasing the range of the device. Possible causes of a dropout are that the pattern 264 may not be evenly distributed and that the pattern 264 may have "dead" spots. Also, different vehicle body styles reflect microwave energy differently.

The embodiment which has been set forth above was for the purpose of illustration and was not intended to limit the invention. It will be appreciated by those skilled in the art that various changes and modifications may be made to the embodiment described in this specification without departing from the spirit and scope of the invention as defined by the appended claims.

We claim:

1. A microwave vehicle detector for detecting traffic movement in a predetermined direction, comprising:
   transceiver means for producing two phase-shifted doppler signals in response to the movement of a target vehicle within the detection range of said microwave vehicle detector;
   signal conditioning means for amplifying said doppler signals and permitting the transmission of said doppler signals above a predetermined signal threshold level; and
   microprocessor means which comprises means for determining the direction of said target vehicle from said transmitted doppler signals, for repeatedly measuring the speed of said target vehicle from at least one of said transmitted doppler signals when said target vehicle is moving in said predetermined direction, for tracking said target vehicle in response to a first predetermined number of said speed measurements, for ceasing to track said target vehicle after a second predetermined number of said speed measurements, for responding to the tracking of said target vehicle by generating at least one signal which is indicative of a speed value associated with the current speed of said target vehicle and for enabling changes in said speed value which are dependent upon said first and second predetermined numbers.

2. The microwave vehicle detector according to claim 1, wherein said microprocessor means is further defined as comprising means for providing a plurality of output signals which are indicative of an average speed value related to the current speed of said target vehicle.

3. The microwave vehicle detector according to claim 2, further including display means for providing a visual indication of said average speed value in response to said output signals from said microprocessor means.

4. The microwave vehicle detector according to claim 3, wherein said display means comprises a bargraph display of said average speed value.

5. The microwave vehicle detector according to claim 4, wherein said microprocessor means is further defined as comprising hysteresis means for preventing said bargraph display from oscillating between two speed bands.

6. The microwave vehicle detector according to claim 1, wherein said first predetermined number defines for said microprocessor means how many speed measurements must be taken before said speed value will be changed while said target vehicle is within the range of said microwave vehicle detector.

7. The microwave vehicle detector according to claim 6, wherein said second predetermined number defines for said microprocessor means how many speed measurement must be taken before said speed value will be changed after a dropout of received doppler signals from said target vehicle.

8. The microwave vehicle detector according to claim 7, wherein said second predetermined number is greater than said first predetermined number.

9. The microwave vehicle detector according to claim 8, wherein said second predetermined number is at least five times greater than said first predetermined number.

10. The microwave vehicle detector according to claim 1, wherein said microprocessor means is further defined as comprising means for a first mode for determining vehicle speeds below a predetermined speed threshold and a second mode for determining vehicle speeds above said predetermined speed threshold.

11. The microwave vehicle detector according to claim 1, wherein said microprocessor means is further defined as comprising means for throwing out spurious doppler signals.

12. The microwave vehicle detector according to claim 11, wherein said means for throwing out spurious doppler signals is is further defined as means for throwing out spurious doppler signals upon a detected speed change which exceeds a predetermined speed change value.

13. The microwave vehicle detector according to claim 11, wherein said microprocessor means is further defined as comprising means for throwing out the first doppler signal received as said target vehicle moves into the detection range of said microwave vehicle detector.

14. The microwave vehicle detector according to claim 1, wherein said transceiver means is further defined as comprising a pair of detector diodes, and said microwave vehicle detector includes means for monitoring the operation of said detector diodes, and said microprocessor means includes means for disabling the tracking of target vehicles if a fault occurs in the operation of either of said detector diodes.

15. The microwave vehicle detector according to claim 14, wherein said microprocessor means is further defined as comprising means for continuing to monitor the operation of said detector diodes after a fault has occurred, and automatically enabling the tracking of target vehicles if existing detector diode faults have ended.

16. A method of generating an indication of the speed of traffic movement in a predetermined direction, comprising the steps of:
providing a microwave transceiver for producing two phase-shifted doppler signals in response to the movement of a target vehicle within a detection range;
repeatedly measuring the speed of a target vehicle in said detection range which is traveling in said predetermined direction;
waiting until a first predetermined number of speed measurements have occurred before permitting an output speed signal to change, such output speed signal being indicative of a speed value associated with the current speed of said target vehicle; and
holding the last output speed signal for a second predetermined number of measurements after at least one of said doppler signals has dropped out to avoid any dead spots in said detection range from changing said output speed signal.

17. The method according to claim 16, wherein said second predetermined number is greater than said first predetermined number.

* * * * *